May 26, 1936.   E. A. STALKER   2,041,795
AIRCRAFT
Original Filed July 2, 1935   5 Sheets-Sheet 1
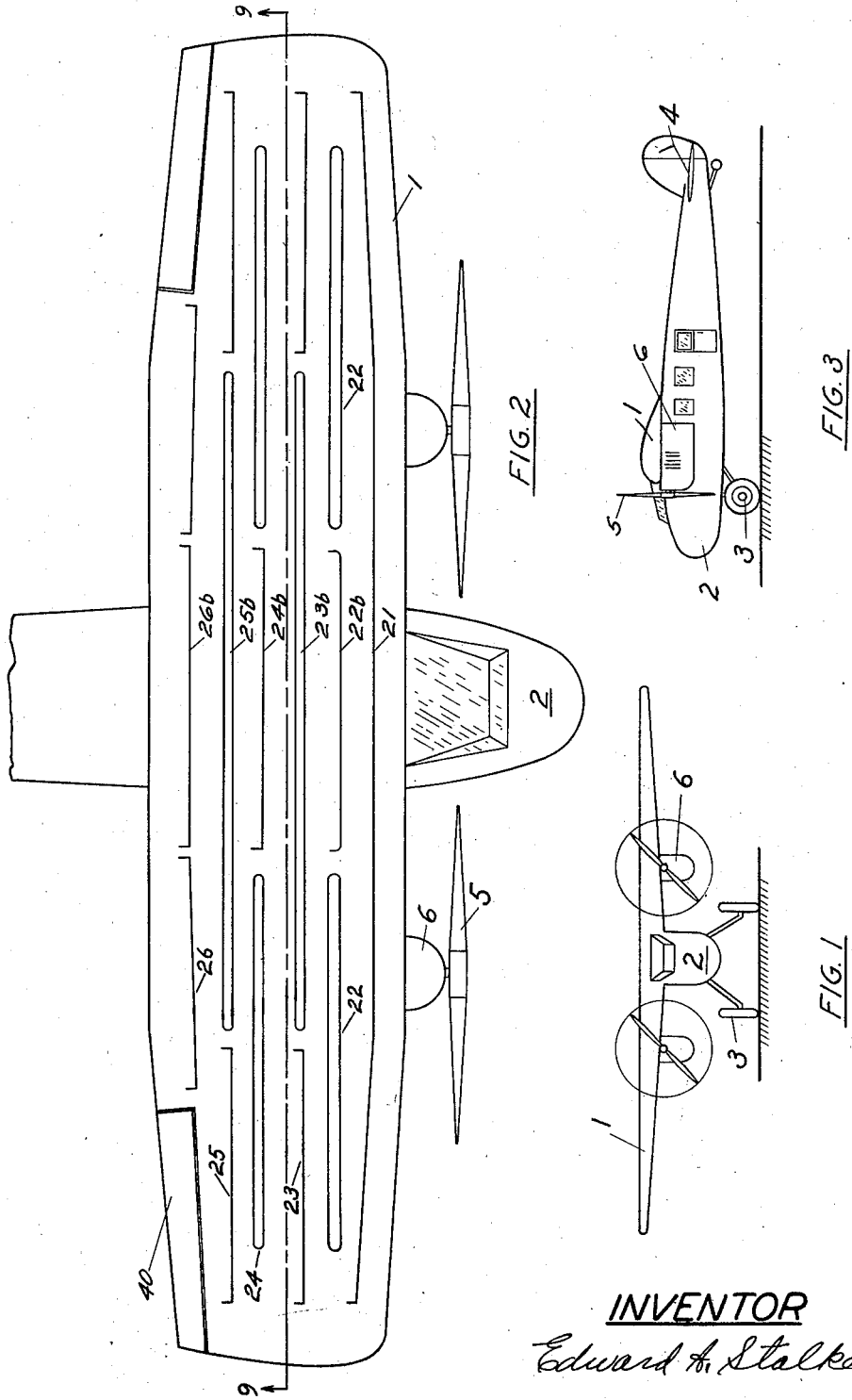
INVENTOR
Edward A. Stalker

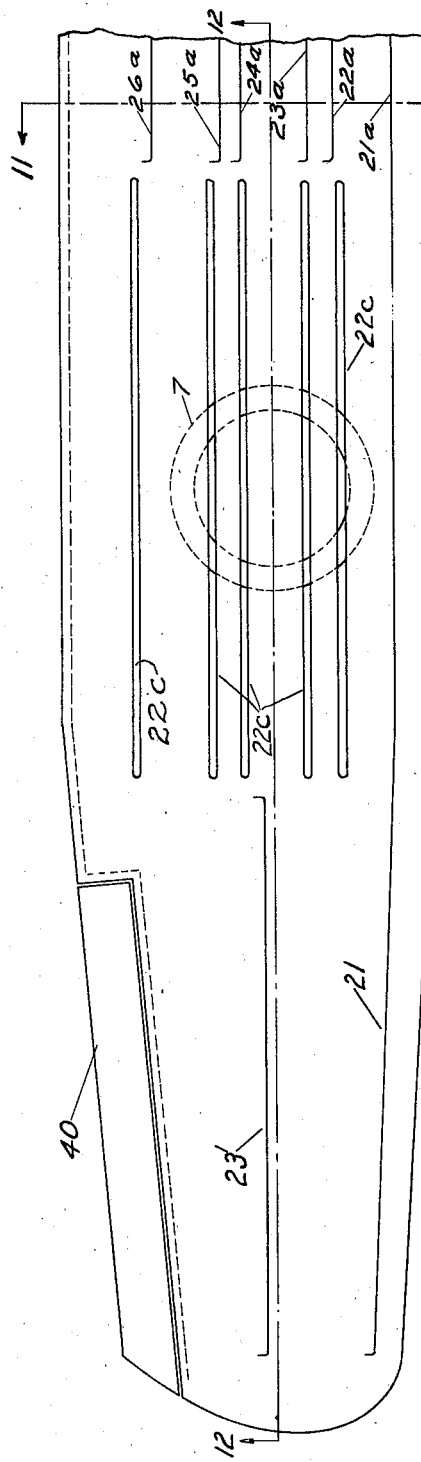
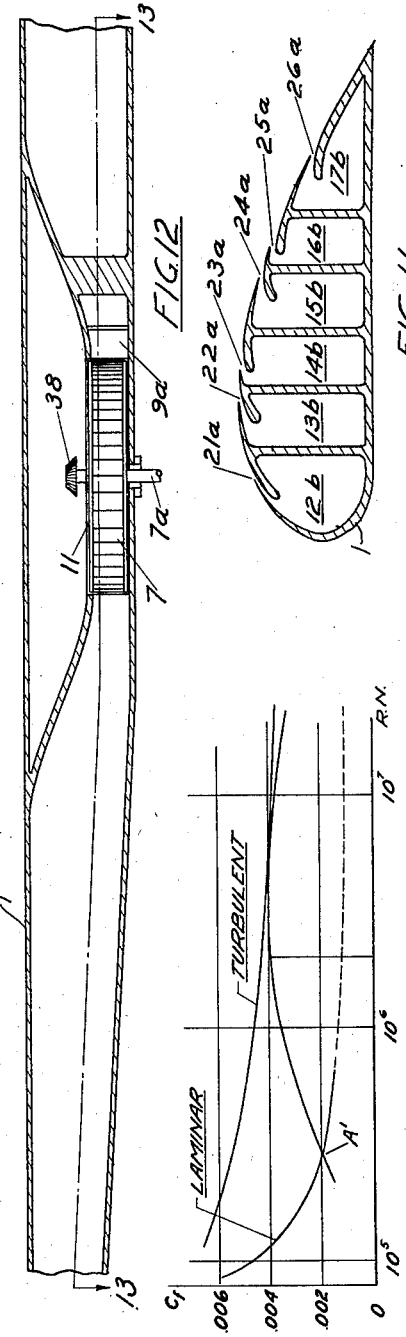

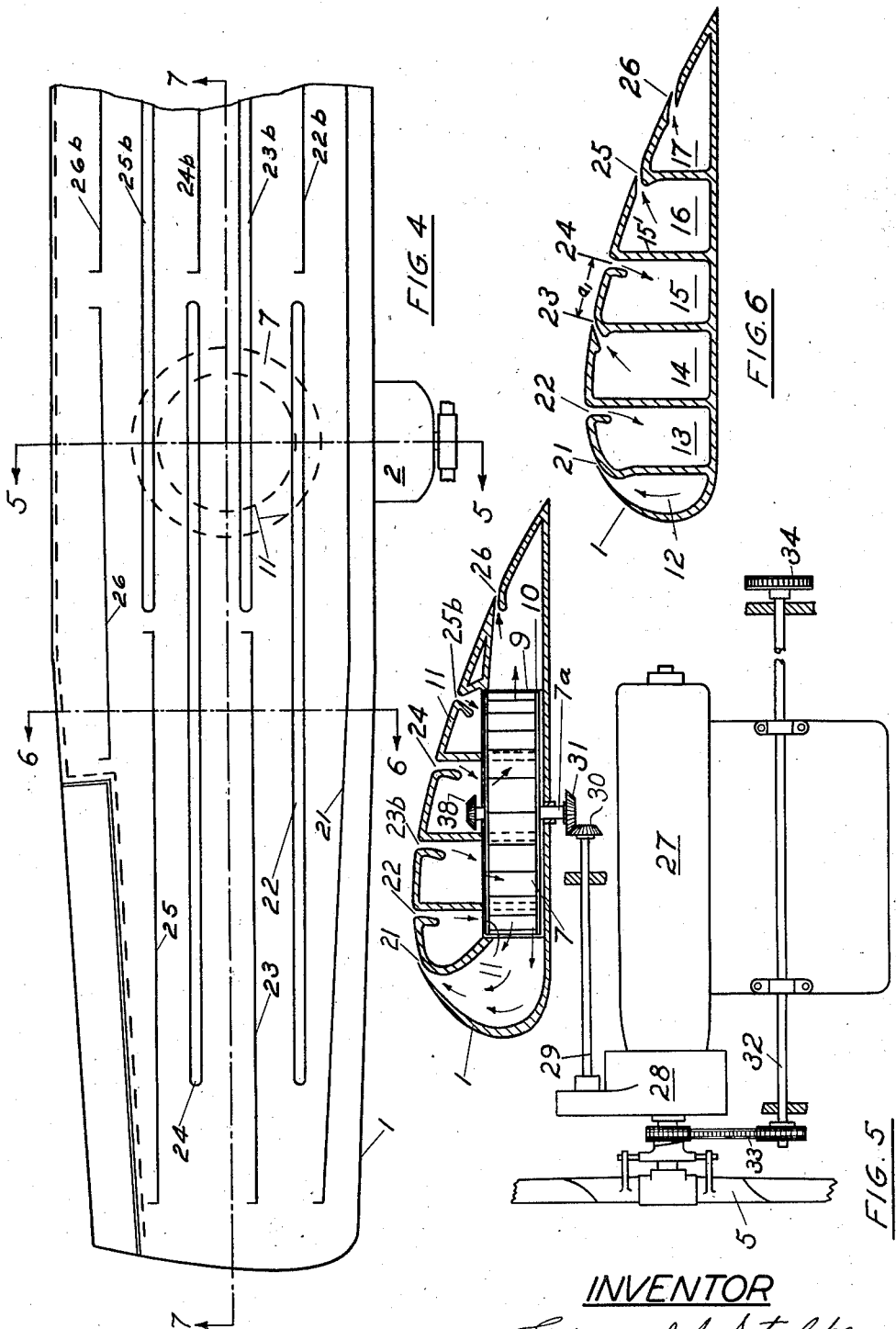

May 26, 1936.  E. A. STALKER  2,041,795
AIRCRAFT
Original Filed July 2, 1935   5 Sheets-Sheet 4
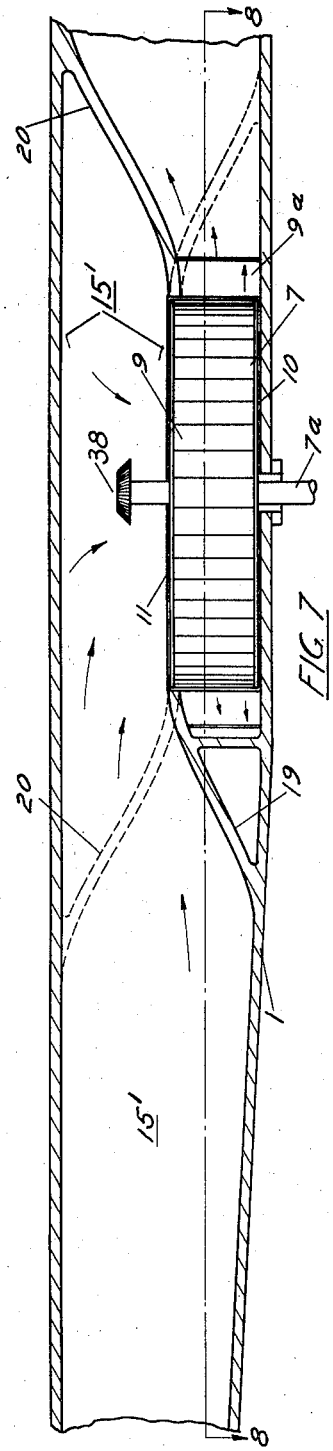
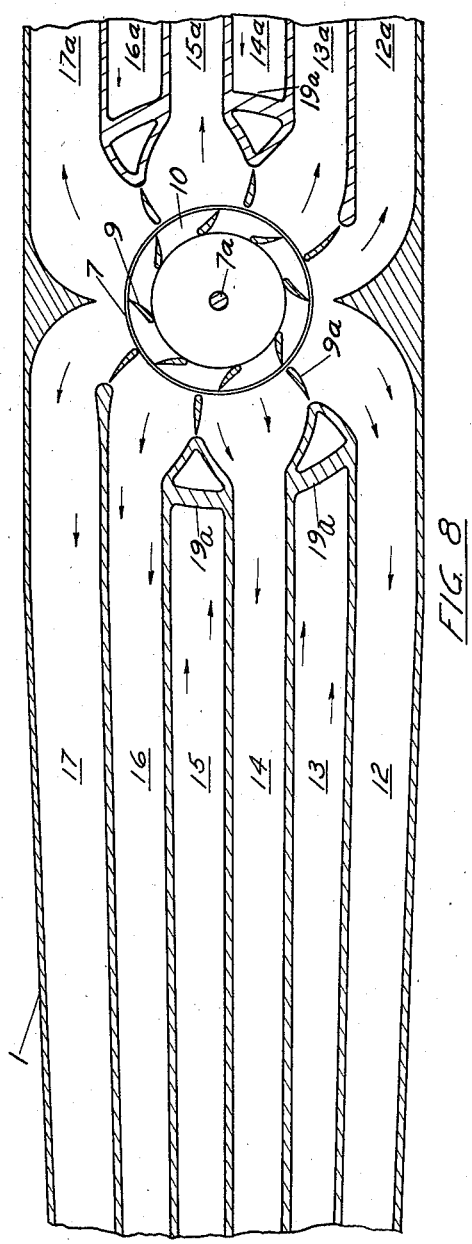
INVENTOR
Edward A. Stalker May 26, 1936.  E. A. STALKER  2,041,795
AIRCRAFT
Original Filed July 2, 1935   5 Sheets-Sheet 5
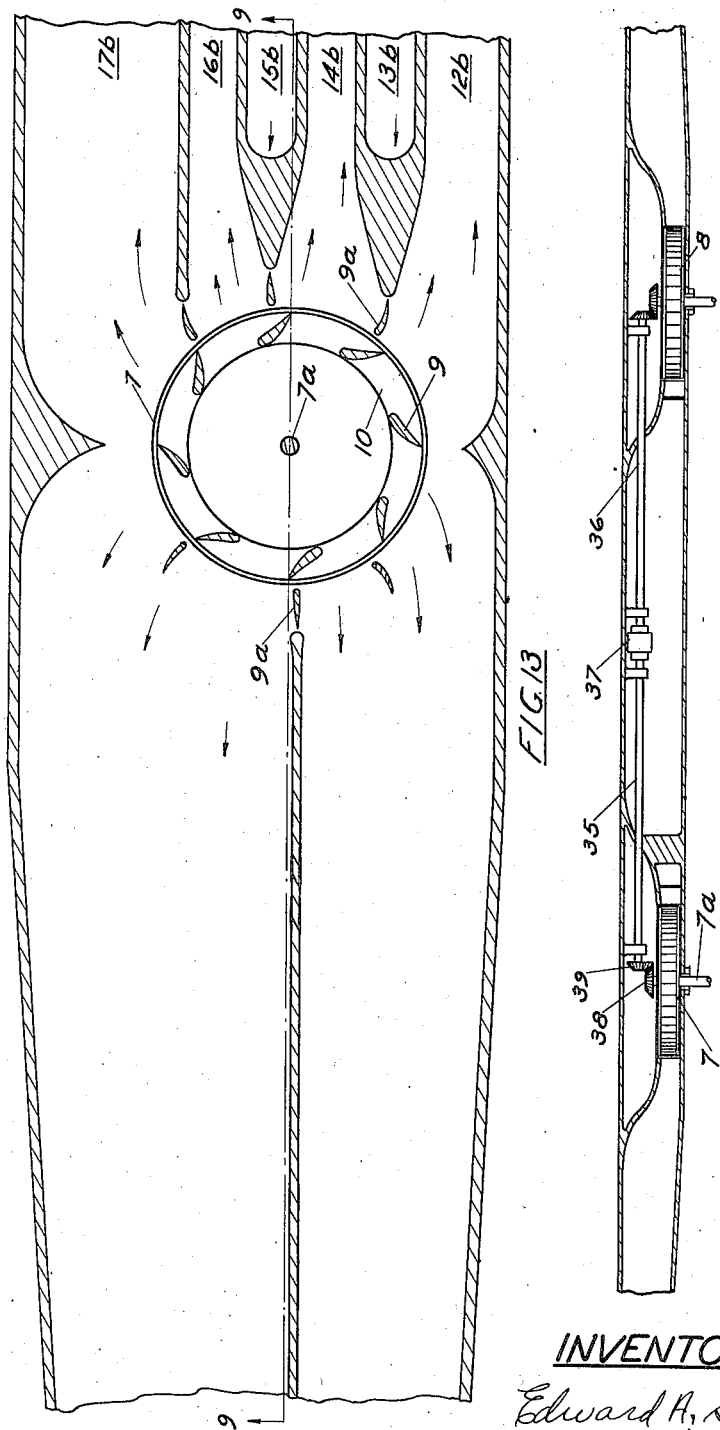

Patented May 26, 1936

2,041,795

UNITED STATES PATENT OFFICE 2,041,795

AIRCRAFT

Edward A. Stalker, Ann Arbor, Mich.

Application July 2, 1935, Serial No. 29,475
Renewed April 3, 1936

13 Claims. (Cl. 244—12)

My invention relates to aircraft and particularly to means of energizing the boundary layer and it has for its objects; first, to provide an efficient arrangement of the slots employed in energizing the layer; second, to provide a more effective and safe means of inducing a flow through the slots.

This application contains subject matter in common with my application Serial Number 10,409, filed March 11, 1935.

I accomplish the above objects by the means illustrated in the accompanying drawings in which—

Figure 1 is a front elevation of the aircraft;

Figure 1a pertains to the theory;

Figure 2 is a fragmentary top plan view of the aircraft;

Figure 3 is a side elevation of the aircraft;

Figure 4 is a fragmentary top plan view of the wing;

Figure 5 is a fragmentary section along the line 5—5 in Figure 4 showing the relation of the wing to the engine and propeller;

Figure 6 is a section along line 6—6 in Figure 4;

Figure 7 is a vertical spanwise section along line 7—7 in Figure 4;

Figure 8 is a planwise section along line 8—8 in Figure 7;

Figure 9 is a fragmentary vertical section extensive through both blowers as indicated by line 9—9 in Figures 2 and 13;

Figure 10 is a fragmentary top plan view of an alternate form of the wing;

Figure 11 is a vertical section along the line 11—11 in Figure 10;

Figure 12 is a fragmentary part section along the line 12—12 in Figure 10;

Figure 13 is a fragmentary section along the line 13—13 in Figure 12.

I reduce the resistance of any aircraft body such as a wing, for instance, by a proper spacing and arrangement of the slots used in energizing the boundary layer.

The application cited above is concerned chiefly with discharge slots whereas the present application is chiefly concerned with arrangements of both induction and discharge slots.

The theory of the types of flow in the boundary layer is significant.

The boundary layer is the layer of fluid adjacent the surface of the body which has appreciably lower local velocities than would exist were the fluid inviscid. The loss in velocity is due to the frictional forces between the fluid and the body surface.

Although the laws of the variation of fluid resistance on a flat surface for both laminar and turbulent boundary layer flow have been known for a number of years, the idea that an object as fast as the airplane can be bathed in a substantially laminar flow is new. Even the idea that it is desirable is new. A flow of air along a flat surface ceases to be entirely laminar when the Reynolds' Number attains the value of 500,000 and on a curved surface such as a wing surface at lower values. For instance, a small airplane having a 4-foot chord flying at 100 miles per hour would have a Reynolds' number of about 3,700,000—in other words, far too high a value for laminar flow. Even for lower values the curvature at the front of the wing or body will precipitate turbulence in the boundary layer.

If a body surface is bathed by a fluid flow, it is customary to represent the frictional drag as $$D_f = C_{Df} \frac{\rho V^2}{2} A \qquad (1)$$

where $A$ is the area bathed, $\rho$ is the mass density of the fluid, $V$ is the stream velocity at a large distance from the surface so that it is substantially unaffected by the surface friction, and $C_{Df}$ is a non-dimensional coefficient.

The magnitude of the friction coefficient $C_{Df}$ is dependent on whether the boundary layer flow is turbulent or laminar. In the case of turbulent flow particles at one instant in touch with the body surface are later some distance from the surface. In laminar flow each stratum of fluid slides over the other and the relative positions are maintained.

The frictional coefficient $C_{Df}$ varies with the Reynolds' number (RN) which is defined as $$RN = \frac{V a \rho}{\mu} \qquad (2)$$

where $a$ is a length of the body along the relative wind and $\mu$ (mu) is the coefficient of viscosity of the fluid. The Reynolds' number is non-dimensional if a consistent set of units is used, like pounds, feet and seconds for the right-hand term. Figure 1a shows how the coefficient varies with Reynolds' number and also shows that there is a critical number (at A') at which the flow ceases to be purely laminar and progresses toward a purely turbulent character. If the flow is free of turbulence and the body is smooth the transition value of the Reynolds' number has a certain value A' but if the flow contains some turbulence or if the body is rough the transition can occur at a smaller value of the Reynolds' number. In aircraft the body surface is made as smooth as possible and the wind gusts are of such magnitude that they envelope the wing, and therefore the gust can be considered simply as a change in wind direction. Experiments with full size aircraft substantiate this conclusion.

Only by taking great precautions can laminar flow be extended beyond the point A'. The smallest disturbance in the air or slight jarring of the plate will precipitate the formation of the turbulent boundary layer. Theory gives the equation of the curve for laminar flow and this equation permits the extension of the laminar curve well beyond the point A'.

It is to be noted that the curve for laminar flow lies well below the curve for turbulent flow. Hence if laminar flow could be maintained in the boundary layer the resistance coefficient $C_{Df}$ and hence the total frictional drag could be kept small. Actually on any present-day aircraft wing or fuselage a turbulent boundary layer always prevails. If laminar flow prevailed the resistance would be about one-half the actual, as indicated by the laminar curve.

It is well known that the relative wind fails to follow the upper surface of a wing when it has a high angle of attack because of the formation of the boundary layer. It is also known that blowing a jet rearward tangentially to the surface will add energy to the boundary layer so that it is in part at least suppressed. The lifting capacity then increases but the increases in lift have been disappointing in view of the energy employed in the jet. I have found two causes for the low effectiveness of the jet. In the first place the jet velocities employed have been so high that the frictional losses along the wing surface have been large, and the spacing of the jets has been such that the flow becomes turbulent and increases the frictional drag. In the second place a boundary layer of the jet itself forms which permits the jet itself to leave the wing surface.

The boundary layer can also be suppressed by drawing off the boundary layer. This can be accomplished by a slot in the surface leading into the wing interior where a lower fluid pressure is made to prevail. Both the blowing and suction procedure is known as energization of the boundary layer.

One method of reducing the energy requirements is given in the application mentioned earlier. I arranged the slots in such a relation to the rest of the wing proportions that low resistance was obtained for high speed flight and a high lifting capacity to provide for slow speed landing. I used a plurality of jets emitted from a plurality of compartments and arranged so that the jet velocity was low relative to the flight speed. I also kept the spacing of the slots small so that the Reynolds' number was low and therefore the jet flow remained laminar. When a jet was about to become turbulent as it traversed the space between jets a second jet was interposed between the first one and the wing surface so that the jet flow was not turbulent adjacent the wing surface. Each successive jet then served to shield the wing surface from turbulence of the preceding jets. The vane-like strip of the surface between slots had a very small curvature so that the values of $C_{Df}$ for a flat plate could be applied to them. This means that the curves of Figure 1a are typical of the vanes as well as for flat plates. The maximum space "$a$" between the jets was then defined by $$a = \frac{100{,}000\mu}{V\rho} \qquad (3)$$

For atmospheric air $\rho$ has the standard value of 0.00237 and $\mu$ has the value of 0.000000374. The value of $\mu/\rho$ is then 0.000159. Values for other fluids are readily found in scientific works such as the "International Critical Tables".

In the present application I describe a means of obtaining high values of the lift coefficient for a small energy expenditure and low values of the drag coefficient, and instead of employing a plurality of discharge slots I use a combination of discharge and induction slots. The laminar flow theory just discussed is again pertinent to the obtainment of the objects sought and defines the best spacing.

Where discharge and induction slots are alternated a greater length of surface can be used between the slots. The induction slot provides a locality of low pressure immediately at the wing surface. If this locality is close enough to the preceding discharge slot the discharged jet will still tend to hug the wing surface even after a small degree of turbulent boundary layer forms because the jet is flowing into the low pressure region at the discharge slot which, as stated, is right at the wing surface and draws the jet downward toward the wing and rearward. From the point of view of fabrication and structural weight it is desirable to keep the number of slots at a minimum.

Especially where maximum lift is the important feature in contrast to forward propulsion, the use of alternated slots is also important from the standpoint of efficiency. Where all the slots discharge fluid outward and each succeeding jet separates the preceding one from the surface, the energy in the discharged jet is in part lost as regards further energization of the boundary layer by the said jet although the energy has served to provide a propulsive force. If on the other hand a suction slot succeeds the discharge slot the turbulent boundary layer of the jet is drawn into the wing and the high energy air of the jet becomes adjacent to the surface and the energy of this part of the jet also serves to energize the boundary layer. Thus by alternating the slots more energy of the jet is utilized in energizing the boundary layer and greater maximum lift coefficients are attainable for a given energy expenditure.

I have found when the induction and discharge slots are alternated that the distance "$a_1$" can be increased as much as 50 per cent for the reasons just given. Hence the equation for the distance "$a_1$" becomes $$a_1 = \frac{1.5 \times 1{,}000{,}000\mu}{V\rho} = \frac{1{,}500{,}000\mu}{V\rho} \qquad (4)$$

It will be noted from Figure 1a that at a Reynolds' number of $10^6$ (one million) the drag coefficient $C_{Df}$ taken on the curve of transition from laminar to turbulent flow has attained almost the transition maximum, and so for low resistance the Reynolds' number should preferably not exceed 1,000,000 as an upper limit for air at atmospheric temperatures. For lower Reynolds' number the coefficient for laminar flow again attains the value at 1,000,000. Hence the best range of coefficient lies between the Reynolds' numbers 200,000 and 1,000,000.

To facilitate expression I refer to the flow as substantially laminar even for values of $C_{Df}$ and RN on the transition curve, since turbulent flow is not completely established until the RN has a value larger than 1,000,000.

The velocity V varies from the landing value to that of high speed and the greater the velocity of flight the smaller the length "$a_1$". Sixty miles per hour (88 feet per second) is about the maximum permissible landing speed for aircraft and for this value "$a_1$" equals one and one-half feet. A more practical landing speed for wings with boundary layer energization is 44 feet per second in which case "$a_1$" is three feet. At 150 feet per second, as for high speed "$a_1$" becomes nine inches while at still higher flight speeds the distance "$a_1$" becomes smaller and for very high speeds would approach zero as a limit. It appears then that in any practical design a compromise must be effected between landing and high speed. In some designs one will be favored over the other depending on whether a high maximum lift for landing or a low drag is desired for high speed. I prefer a value of about one and one-half feet or less for the airplane for general use.

As previously remarked, at the Reynolds' number 200,000 the drag coefficient $C_{Df}$ has risen for laminar flow to an equal value at 1,000,000 on the transition curve. But as has already been pointed out, for an increase in the velocity as the maximum flight speed increases, "$a_1$" approaches the minimum value zero no matter what the value of the Reynolds' number. Hence for the lower limit "$a_1$" always has the value zero.

The jet velocity out the upper surface should be larger than the velocity of the relative wind (flight velocity) because the local velocity on the upper surface arising from the relative wind will be larger. The flight velocity can, however, be taken as the lower limit of the jet velocity and actually could be used for the slots near the trailing edge, although I also prefer to keep the velocity out the last slot quite high, even somewhat higher than the jets just preceding.

When air is withdrawn from a compartment having a spanwise slot the flow through the slot into the compartment tends to be chiefly through the slot portion near the blower. On the other hand, when air is discharged into a compartment for discharge from the slot the air tends to leave chiefly at the far end of the slot. Advantage can be taken of these phenomena to improve the efficiency of the apparatus.

The slots for the induction of air are located chiefly near the blowers, and the slots for the discharge of air are chiefly more distant.

It is not always necessary that single induction and discharge slots be alternated. It is sometimes desirable to alternate groups of discharge and induction slots.

In Figures 1, 2, and 3 the wing is 1, the fuselage is 2 and the landing gear is 3. The tail group is 4 and the propeller is 5. The engine nacelles are 6. In Figures 4 to 10 especially are shown the arrangement of the spaced blowers and slots. There are two blowers 7 and 8 which consist of vertical vanes 9 rotatable about the upright axis of shaft 7a. The vanes are attached to the shaft 7a by a disk 10. At their upper end an annular disk 11 connects the blades and provides an inlet for the air impelled by the vanes.

The height of the blower is about one-half the thickness of the wing. The compartments 12 to 17 serve to conduct the flow to and from the blower. As shown in Figures 4 and 7 the lower walls 19 of the suction compartments are curved gently upward to the level of the top of the blower; the upper walls 20 of the discharge compartments curve downward to the same level. The compartments are therefore closed to each other except through the blower. These walls merge into the outer walls of the wing at some distance from the blowers.

The guide vanes 9a guide the flow from the blowers 7 and 8 into the compartments.

Each blower serves compartments on either spanwise side of its axis, the compartment on one side being a suction compartment and on the other side a discharge compartment. This particular arrangement need not always be followed. The compartments extending between the spaced blowers are indicated by the numerals 12a to 17a. The slots in communication with the compartment interiors are numbered 21 to 26 and 22b to 26b.

Each compartment has a slot associated with it and the suction slots extend across the blower beyond its farthest side. Thus there is a concentration of the suction slots above each blower. The vertical walls of the suction compartments extend across the blower inlet and divide it into the proper inlet area for each compartment. For instance, in Figure 7 the wall 15' extends across the top of the blower 7 to the wall 20 shown in solid lines.

The blowers are driven either by the engines 27 or the propellers 5 acting as windmills. This particular manner of drive has been described in my Patent No. 1,913,644. It is therefore sufficient to say that a gear transmission and overrunning clutch within the housing 28 permits the propeller 5 to drive the shaft 29 without the necessity of rotating the engine 27. The shaft 29 drives the blower 9 by means of the bevel gears 30 and 31. The propeller pitch is adjustable by means of the shaft 32 and chain 33. The sprocket 34 at control end of shaft 32 can be operated through a chain (not shown) by the pilot in the central fuselage.

To provide against a dissymmetry in lift should one of the propellers be broken, the blowers are interconnected by the shafts 35 and 36 which can be coupled together by the coupling 37. See Figure 9. The gears 38 and 39 transmit torque between the blowers and shafts. The interconnecting shaft can, of course, also be used with any number of engines and driving of the blowers can, if desired, be effected through interconnecting shafts such as 35 and 36.

Lateral control can be effected through the ailerons 40 and the conventional mechanism for operating them.

An alternate form of the wing is shown in Figures 10 to 13. The wing surface above the blower 7 is devoted entirely to induction slots and the space between the induction slots is devoted entirely to discharge slots 21a to 26a. Each slot of a pair such as 22a and 23a is served by a different blower. Thus blower 7 discharges air from slot 22a and the blower 8 discharges from slot 23a. The type of construction of the compartments within the wing is similar to that shown in Figure 8 but, of course, the arrangement of discharge and induction slots is not the same but is as indicated in Figures 10 to 13. The wing tip sections have only blowing slots 21 and 23'.

Referring again to Figure 8 it is to be observed how the compartment 14a served by the blower 8 is terminated by an end wall 19c. A compartment 15a served by blower 7 is terminated in a like manner near the blower 8. A similar type of construction is employed in Figure 13 for the compartments between the blowers.

An advantage in using spaced blowers with two spanwise slots adjacent to each other is that the energization of the boundary layer tends to be more uniform along the span. This is so because the flow out of the wing through the slot tends to be a maximum at the far end. Where each blower blows air toward the other to serve adjacent slots, the flow of one slot supplements the flow from the other where it is deficient. Thus in Figures 10 and 11 the slots 22a and 23a are each served with air by one of the blowers 7 and 8 and the combined discharge gives a good distribution of jet flow along the span.

In a similar manner a discharge slot and an induction slot serve to provide a uniform spanwise distribution of boundary layer energization. The blower inducts air chiefly from the end of the slot near the blower and discharges chiefly from the far end of the discharge slot. As shown in Figure 4, the slots 23 and 24 in the outer extremity of the wing, for instance, distribute the energization effect of the blower 7 to great advantage along the span. I prefer the slot arrangement illustrated in Figures 1 to 10 inclusive.

In order to achieve this effective distribution of boundary layer energization along the span the suction and discharge slots should preferably not be further apart chordwise than 20 per cent of the chord.

While I have illustrated specific forms of the invention it is to be understood that I do not intend to limit myself to these exact forms but intend to claim my invention broadly as set forth in the appended claims.

I claim:

1. In an aircraft in combination a hollow body having a plurality of induction and discharge slots in communication with the body interior, and a means of blowing in communication with said slots to cause an inflow at the induction slots and a discharge at the discharge slots, said induction and discharge slots being virtually alternated along the body in the direction of flight.

2. In combination a hollow body having a plurality of compartments within and a plurality of slots in the body surface in communication with said compartment interiors, and a blower means in communication with said compartments to cause a flow through said slots to energize the boundary layer, said slots comprising induction and discharge slots of which the induction slots as a group are disposed nearer to the inlet of said blower means than the discharge slots are to the discharge side of said blower means.

3. In combination, a hollow wing having a plurality of slots in its surface in communication with the wing interior, a blower means in communication with said wing interior to induce flows through said slots to energize the boundary layer, said slots comprising induction and discharge slots, said induction slots as a group being situated nearer the inlet of said blower means than the discharge slots as a group are near to the discharge side of said blower means, comparable distances in the wing being taken spanwise.

4. In combination, a hollow wing having a plurality of slots in the upper surface in communication with the wing interior, a plurality of spaced blower means in communication with the wing interior to induce a flow through said slots to energize the boundary layer on the wing surface, power means for said blower means to actuate them, and means operably connecting said blower means to coordinate their operation.

5. In combination, a hollow wing having a plurality of slots in the upper surface in communication with the wing interior, a plurality of spaced blower means in communication with the wing interior to induce a flow through said slots to energize the boundary layer on the wing surface, transmission means for said plurality of blower means to transmit power therebetween, and means to disengage said transmission means from a blower means.

6. In combination, a wing having at least two compartments within and at least two rearward directed slots in the same side surface, each slot of a pair leading out of a separate compartment, and at least two spaced means of blowing each in communication with a said separate compartment to discharge a flow of fluid through said compartment toward the other means of blowing so that fluid jets are dischargeable to supplement each other and thereby energize the boundary layer effectively.

7. In combination, a hollow wing having a plurality of discharge and induction slots in the surface in communication with the wing interior, and a means of blowing in communication with said wing interior to cause an inflow at some slots and outflow at other slots, said induction slots being virtually alternated with said discharge slots to provide an efficient distribution of the slot flow.

8. In combination, a hollow wing having a plurality of discharge and induction slots in the surface in communication with the wing interior, a means of blowing in communication with said wing interior to cause an inflow at some slots and an outflow at other slots, said induction slots being virtually alternated with said discharge slots, some of said induction slots being spaced apart chordwise at distances less than one and one-half feet from said discharge slots so as to maintain a low resistance flow adjacent the wing surface.

9. In combination, a wing having a plurality of compartments within, and at least two spaced blower means communicating with the said compartments, the wing surface between the said means of blowing having a plurality of slots in communication with said compartments, some of said slots communicating with one blower means and some with the other through different compartments.

10. In combination a wing having a plurality of compartments within, and at least two spanwise spaced blower means communicating with the said compartments, the wing surface between the said means of blowing having a plurality of slots in communication with said compartments, some of said slots being discharge slots and others induction slots, the two types being substantially alternated in a chordwise direction to provide a desirable distribution of the energization of the boundary layer by the slot flows.

11. In combination, a wing having compartments within and slots in the wing surface in communication with the compartment interiors, and a plurality of spaced means of blowing in communication with said compartment motivating fluid through separate compartments toward each other for discharge from said surface slots, the means of blowing inducting fluid chiefly from the slots in the wing surface extensive across the inlet to the means of blowing to provide an efficient means of energizing the boundary layer.

12. In combination, a wing having compartments within and a plurality of slots in the wing surface in communication with the compartment interiors, and a plurality of spanwise spaced means of blowing in communication with said compartments to motivate flows through said slots, said plurality of slots including induction and discharge types of slots with the said types being substantially alternated along the span to provide a large volume of air for induction and discharge by the said means of blowing to energize the boundary layer with a low expenditure of energy.

13. In an aircraft, a hollow wing having a perforated surface to form induction and discharge slots in communication with the wing interiors, a means to energize the boundary layer of the wing efficiently including said induction and discharge slots which are substantially alternated in the chordwise direction, said discharge slots having overlapping sides and being rearwardly directed to emit fluid jets rearward along the wing surface, and blower means to induce jet flows through the slots to energize the boundary layer, said slots being spaced chordwise at distances less than the quotient of the product of one and one-half million by the coefficient of viscosity of the jet fluid divided by the product of the flight velocity and the jet fluid density, at least one slot being located aft of the locality of maximum thickness of the wing section so that the flow relative to the wing is induced to follow the surface with a low energy expenditure.

EDWARD A. STALKER.